(12) United States Patent
Chaiko et al.

(10) Patent No.: US 10,781,501 B2
(45) Date of Patent: Sep. 22, 2020

(54) ACTIVATION SYSTEM AND METHOD FOR ENHANCING METAL RECOVERY DURING ATMOSPHERIC LEACHING OF METAL SULFIDES

(71) Applicant: FLSmidth A/S, Valby (DK)

(72) Inventors: David J. Chaiko, South Jordan, UT (US); Frank Baczek, Salt Lake City, UT (US); Sara (Sally) Rocks, Sandy, UT (US); Carlos Eyzaguirre, Draper, UT (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 15/527,489

(22) PCT Filed: Nov. 20, 2015

(86) PCT No.: PCT/US2015/062000
§ 371 (c)(1),
(2) Date: May 17, 2017

(87) PCT Pub. No.: WO2016/081908
PCT Pub. Date: May 26, 2016

(65) Prior Publication Data
US 2017/0356063 A1    Dec. 14, 2017

Related U.S. Application Data (60) Provisional application No. 62/082,293, filed on Nov. 20, 2014.

(51) Int. Cl.
*C22B 3/04* (2006.01)
*C22B 3/02* (2006.01)
*C22B 15/00* (2006.01)

(52) U.S. Cl.
CPC ............ *C22B 3/04* (2013.01); *C22B 3/02* (2013.01); *C22B 15/0065* (2013.01);
(Continued)

(58) Field of Classification Search
CPC ......... C22B 3/04; C22B 3/02; C22B 15/0095; C22B 15/0065; Y02P 10/234; Y02P 20/236; Y02P 10/236
See application file for complete search history.

(56) References Cited

U.S. PATENT DOCUMENTS 3,443,932 A * 5/1969 Melin ................. C22B 3/04
                                                    423/31
3,616,331 A    10/1971 O'Neill et al.
(Continued)

FOREIGN PATENT DOCUMENTS

WO    WO-2004106561 A1 * 12/2004 ......... C22B 15/0008
WO    2014074985    5/2014

OTHER PUBLICATIONS

Cowper, Mark and David Rickard. "Mechanism of chalcopyrite formation from iron monosulphides in aqueous solutions (< 100 C, pH 2-4.5)." Chemical Geology, 78 pp. 325-341. (Year: 1989).*
(Continued)

*Primary Examiner* — Tima M. McGuthry-Banks
(74) *Attorney, Agent, or Firm* — Jeffrey A. Sharp (57) ABSTRACT

A method of improving metal leach kinetics and recovery during atmospheric or substantially atmospheric leaching of a metal sulfide is disclosed. In some embodiments, the method may comprise the step of processing a metal sulfide concentrate in a reductive activation circuit 220 that operates at a first redox potential, to produce a reductively-activated metal sulfide concentrate. The method may further comprise the step of subsequently processing the activated metal sulfide concentrate in an oxidative leach circuit 240 to
(Continued)

extract metal values. In some disclosed embodiments, reductive activation steps and/or oxidative dissolution steps may employ mechano-chemical and/or physico-chemical processing of particles or agglomerates thereof. Reductive activation may be made prior to heap leaching or bio-leaching operations to improve metal extraction. Systems for practicing the aforementioned methods are also disclosed.

24 Claims, 9 Drawing Sheets

(52) U.S. Cl.
CPC ......... *C22B 15/0095* (2013.01); *Y02P 10/234* (2015.11); *Y02P 10/236* (2015.11)

(56) References Cited

U.S. PATENT DOCUMENTS

| | | |
|---|---|---|
| 4,157,912 A | 6/1979 | Weir et al. |
| 4,256,553 A | 3/1981 | Baczek et al. |
| 4,671,945 A | 6/1987 | Thomassen et al. |

OTHER PUBLICATIONS

Elliot, Alexander Dean and Helen R. Watling. "Chalcopyrite formation through the metathesis of pyrrhotite with aqueous copper." Geochimica et Cosmochimica Acta 75 pp. 2103-2118. (Year: 2011).*
Schwartz, Harold. "Sulfur." ProKon. The Calculation Companion. ShowMe Software. Jefferson City, MO. (Year: 1988).*
Positive International Preliminary Report on Patentability (dated Dec. 30, 2016).

* cited by examiner

FIGURE 1

Leaching of chalcopyrite in accordance with one aspect of the invention.

FIGURE 2

Uptake of copper by chalcopyrite during the Physico-Chemical Activation Process. The data are plotted as a function of the square root of time to show that the activation process is rate limited by the solid-state diffusion of copper.

FIGURE 3

Dissolution of copper from a chalcopyrite concentrate in accordance with an aspect of the invention.

FIGURE 4

Range of enargite leach times with varying mineralogy (i.e., ratio of chalcopyrite/enargite and pre-activation of chalcopyrite) and total iron in the leach liquor.

FIGURE 5

Circuit used for batch leach test of chalcopyrite dissolution according to an aspect of the present invention wherein a Stirred-Tank reactor is coupled to a Shear-Tank Reactor.

ACTIVATION SYSTEM AND METHOD FOR
ENHANCING METAL RECOVERY DURING
ATMOSPHERIC LEACHING OF METAL
SULFIDES

CROSS REFERENCE TO RELATED APPLICATIONS

This application is a U.S. national stage entry of International Patent Application No. PCT/US2015/062000 filed on 20 Nov. 2015 and titled "ACTIVATION SYSTEM AND METHOD FOR ENHANCING METAL RECOVERY DURING ATMOSPHERIC LEACHING OF METAL SULFIDES," the contents of which is incorporated by reference in its entirety for any and all purposes as if fully set forth herein. This application claims the benefit of U.S. Provisional Patent Application No. 62/082,293 filed on 20 Nov. 2014 and titled "SYSTEM AND METHOD FOR ENHANCED METAL RECOVERY DURING ATMOSPHERIC LEACHING OF METAL SULFIDES," the contents of which is hereby incorporated by reference in its entirety for any and all purposes as if fully set forth herein. This application also relates to International Patent Application No. PCT/US2015/050045 filed on 14 Sep. 2014 and titled "SYSTEM AND METHOD FOR ENHANCED METAL RECOVERY DURING ATMOSPHERIC LEACHING OF METAL SULFIDES," the contents of which is hereby incorporated by reference in its entirety for any and all purposes as if fully set forth herein. This application further relates to international Patent Application No. PCT/US2015/061761 filed on 20 Nov. 2014 and U.S. patent application Ser. No. 15/526,826 filed on 15 May 2017 titled "SYSTEM AND METHOD FOR ENHANCED METAL RECOVERY DURING ATMOSPHERIC LEACHING OF METAL SULFIDES," the contents of which is hereby incorporated by reference in its entirety for any and all purposes as if fully set forth herein.

FIELD OF THE INVENTION

Embodiments of the invention relate to equipment, flowsheets, and processes for improving metal value extraction from metal sulfide ores. In particular, systems and methods for increasing metal recovery within an atmospheric, or substantially atmospheric, metal sulfide leach circuit via low-yield metathesis reactions are disclosed.

BACKGROUND OF THE INVENTION

Current and past methods of atmospheric leaching of primary metal sulfides (e.g., Chalcopyrite, Tennamite, and Enargite), may suffer from slow reaction kinetics and poor metal recoveries due to surface passivation effects during oxidative leaching. Surface passivation occurs when the growth of an elemental sulfur product layer occludes the surfaces of the particles being leached. The sulfur reaction product layer acts as a physical barrier, impeding the transport of reactants and products from the reaction plane.

A number of factors may enhance the detrimental effects of the sulfur product, with regard to metal dissolution, by altering the porosity and/or tortuosity of the product layer. These factors, individually or collectively, include crystal phase transformations, partial melting and recrystallization, or complete crystal melting. The range of passivation effects will depend upon the temperature of the reaction medium and the temperature at the reaction zone which may be different from the overall system temperature. This temperature difference may be sustained throughout the entire leach process or it may be transitory.

Other mechanisms of passivation can include the formation of non-stoichiometric, metal-deficient sulfide phases that are resistant toward further anodic dissolution reactions. Furthermore, if the dissolution of the metal sulfide is taking place via an electrochemical redox mechanism, the anodic dissolution step will be dependent upon the pH and redox potential at the reaction plane.

A number of past methods have been attempted to increase metal leach rates by employing leach catalysts. One approach suggested addressing the passivation issue by increasing electron transport though an electrically-resistive, reaction-product layer by doping the layer with fine particulate carbon (see for example U.S. Pat. No. 4,343,773). Moreover, a more recently-proposed method (US-2012/0279357) for addressing passivation relies on the addition of an activated carbon catalyst to enhance the leach rate of arsenic-containing copper sulfides. Still other approaches have used silver-based catalytic leach systems for enhancing the copper dissolution rates in acidic ferric sulfate media (J. D. Miller, P. J. McDonough and P. J. Portillo, Electrochemistry in Silver Catalyzed Ferric Sulfate Leaching of Chalcopyrite, in Process and Fundamental Considerations of Selected Hydrometallurgical Systems, M. C. Kuhn, Ed., SME-AIME, New York, pp. 327-338, 1981), while others have used silver-activated pyrite to accomplish similar results (U.S. Pat. No. 8,795,612). The Applicant has further recently proposed a method and process for the enhanced leaching of copper-bearing sulfide minerals which utilizes microwave irradiation during leaching to combat the adverse effects of passivation on leaching (WO2014074985A1).

Some have attempted to avoid the surface passivation reactions that plague the leaching of primary sulfides by chemical pre-treatment of chalcopyrite, to effect its complete conversion to more readily leached sulfide phases. For example, U.S. Pat. No. 6,592,644 (now abandoned) teaches toward complete conversion of chalcopyrite to covellite and pyrite, prior to leaching under oxidizing conditions; the conversion process being represented by the following equation:

$$CuFeS_2 + S^\circ \rightarrow CuS + FeS_2$$

To proceed at commercially viable rates, the reaction must be carried out at elevated temperatures 300-500° C.) and/or catalyzed by irradiation with microwaves. The degree of copper recovery during the leach process depends upon a complete and full degree of conversion of chalcopyrite to covellite, which makes the approach expensive and unattractive for large-scale commercial applications.

Still other prior art methods have attempted to increase leach rates and copper recoveries through the use of solid-state chemical metathesis of chalcopyrite to covellite, chalcocite, and digenite ($Cu_{1.8}S$) (see, for example, G. M. Swinkels and R. M. G. S. Berezowsky, "The Sherritt-Cominco Copper Process—Part 1 The Process," CIM Bulletin, February 1978, pp. 105-121; see also R. D. Peterson and M. E Wadsworth, "Solid, Solution Reactions in the Hydrothermal Enrichment of Chalcopyrite at Elevated Temperatures," The Minerals, Metals & Materials Society, EPD Congress, G. Warren Ed., pp. 275-291, 1994; and W. A. Yuill, D. B. Wilson, R. O. Armstrong and B. A. Krebs, "Copper Concentrate Enrichment Process," presented at the AIME Annual Meeting, Los Angeles, Calif., February 1984). These solid-state reactions involve the replacement of iron within the chalcopyrite lattice by copper with the diffusion of iron through the product layer as the rate controlling step. Several of these approaches may be represented by the following equations:

$$CuFeS_2 + CuSO_4 \rightarrow 2CuS + FeSO_4$$

$$CuFeS_2 + 3CuSO_4 + 3FeSO_4 \rightarrow 2CuS_2 + 4Fe_2(SO_4)_3$$

$$5CuFeS_2 + 11CuSO_4 + 8H_2O \rightarrow 8Cu_2S + 5FeSO_4 + 8H_2SO_4$$

$$5CuS + 3CuSO_4 + 4SO_4 + 4H_2O \rightarrow 4Cu_2S + 4H_2SO_4$$

$$6CuS + 3CuSO_4 + 4H_2O \rightarrow 5Cu_{1.8}S + 4H_2SO_4$$

As with other prior art methods, with these approaches, there is a need to achieve near-complete conversion of chalcopyrite to the more readily-leached secondary sulfides. Additionally, these approaches require the use of high temperatures (e.g., 175-200° C.) under autoclave conditions to achieve the required degree of conversion. Even with the use of high temperatures, accompanied by ultra-fine grinding of the feed, reaction times of 10-100 hours are required to reach 40-90% conversion of chalcopyrite to secondary sulfides, which then need to be leached, adding additional hours on top of the 10-100 hour conversion process. Additionally, several of the approaches involve the production of acid which is problematic, because the production of acid involves the oxidation of sulfide to sulfate, thereby adding to the cost of the process.

Attempts to carry out chemical metathesis reactions under atmospheric conditions have seen little success (see H-J. Sohn and M. E. Wadsworth, "Chemical Conversion of Chalcopyrite to Copper Sulfides," SME-RIME Annual Meeting, Los Angeles Calif., Feb. 26-Mar. 1, 1984). Reactions at lower temperatures require pre-grinding of the feed in attritor mills for one hour or longer, and reaction conditions of 0.5 wt. % solids, making low-temperature metathesis uneconomical. Even at 90° C., reaction times in excess of 60 hours were required in order to reach chalcopyrite conversion levels of 70-75%. Furthermore, such approaches are also plagued by parasitic side reactions which consume $CuSO_4$ to yield undesirable products like $Cu_{1.8}S$.

The present invention departs from all prior art methods involving the copper metathesis of chalcopyrite in that the effectiveness of the novel metathesis systems and methods disclosed herein is, to a large part, independent of the degree of completion of the conversion during the metathesis reaction and the ability to control the reaction to produce an iron-depleted metastable phase that is intermediate between chalcopyrite and covellite. In fact, with the novel metathesis systems and methods disclosed herein, much less than full conversion is required, and as little as less than 5% conversion of chalcopyrite to a metastable non-stoichiometric binary metal sulfide phase is required for favorable copper recovery.

The inventive activation process is: 1) rapid—requiring very little time or only a few minutes to complete, 2) able to function efficiently at moderate temperatures (e.g., less than about 90-100° C. or the melt temperature of elemental sulfur), 3) able to operate efficiently at high solids concentrations, 4) operates at moderate pH values (e.g., 2-6), 5) capable of enabling chalcopyrite dissolution to levels in excess of 90-95% in 6-9 hours or less, without limitation. Additionally, the inventive activation process is free of parasitic side reactions which could consume $Cu^{++}$.

OBJECTS OF THE INVENTION

It is, therefore, an object of some embodiments, to provide a reductive activation circuit for improving the hydrometallurgical processing of primary metal sulfides which promotes rapid metal dissolution in a downstream oxidative leach circuit.

It is also an object of some embodiments of the present invention, to provide a reductive activation circuit for improving, the hydrometallurgical processing of primary metal sulfides, wherein metal dissolution in a downstream oxidative leach circuit may be able to function efficiently at low to moderate temperatures below the melting point of sulfur.

It is yet even another object of some embodiments, to provide a reductive activation circuit for improving the hydrometallurgical processing of primary metal sulfides, which may be capable of enabling chalcopyrite dissolution in a downstream oxidative leach circuit to levels in excess of 90-95% within approximately 1-10 hours, for example, within approximately 1.5-6 hours or within approximately 2-5 hours.

It is also an object of some embodiments, to provide a reductive activation circuit for improving the hydrometallurgical processing of primary metal sulfides, such that metal dissolution in a downstream oxidative leach circuit may be substantially free of parasitic side reactions which might consume Cu++.

It is also an object of some embodiments of the present invention, to improve leach kinetics and metal recovery through the employment of a reductive activation circuit upstream of an oxidative leach circuit.

It is a further object of some embodiments, to provide a reductive activation circuit prior to an oxidative leach circuit; wherein the reductive activation circuit may be configured to induce lattice strain and alter the electrochemical properties within leach particles through small levels of conversion to one or more transitory/transitionary, metastable, non stoichiometric binary metal sulfide phases.

According to yet further objects of some embodiments, the efficiency of tank or vat leaching operations may be improved through the provision of a reductive activation circuit configured for reductively activating an ore prior to a tank or vat leaching circuit.

It is further desired to mitigate the effects of mechanical and/or electrochemical passivation by employing reductive activation techniques within a reductive activation circuit prior to oxidative leaching in an oxidative leach circuit.

It is another object of some embodiments to mitigate the effects of mechanical and/or electrochemical passivation within oxidative leach circuits by employing mechano-chemical/physico-chemical activation techniques within a reductive activation circuit.

These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A metal sulfide leach circuit 200 having therein, a reductive activation circuit 220 configured for performing low-yield metathesis reactions which are capable of producing an iron-depleted metastable phase on metal sulfide leach particles is disclosed.

According to some embodiments, the reductive activation circuit 220 is configured such that the low-yield metathesis reactions produce the iron-depleted metastable phase at outer surface portions of the metal sulfide leach particles.

According to some embodiments, the reductive activation circuit 220 is configured such that the low-yield metathesis reactions produce the iron-depleted metastable phase at inner portions of the metal sulfide leach particles which are below outer surface portions of the metal sulfide leach particles. According to some embodiments, the reductive activation circuit 220 is configured such that the low-yield metathesis reactions produce point defects within a portion of each of the metal sulfide leach particles. According to some embodiments, the reductive activation circuit 220 is configured such that the low-yield metathesis reactions produce point defects substantially entirely throughout the metal sulfide leach particles. According to some embodiments, a portion of the iron-depleted metastable phase comprises an intermediate phase between chalcopyrite and covellite. According to some embodiments, a portion of the iron-depleted metastable phase is transitory, transitionary, or metastable.

According to some embodiments, the metal sulfide leach circuit 200 comprises means for controlling the low-yield metathesis reactions to limit the production of the iron-depleted metastable phase on die metal sulfide leach particles to between about 0.01% and about 10% by weight or volume of the metal sulfide leach particles. According to some embodiments, the low-yield metathesis reactions may be controlled so as to limit the production of an iron-depleted metastable phase on metal sulfide leach particles to between about 0.01% and about 5.0% by weight or volume of the metal sulfide leach particles. According to some embodiments, the low-yield metathesis reactions may be controlled so as to limit the production of an iron-depleted metastable phase on metal sulfide leach particles to between about 0.01% and about 4.0% by weight or volume of the metal sulfide leach particles. According to some embodiments, the low-yield metathesis reactions may be controlled so as to limit the production of an iron-depleted metastable phase on metal sulfide leach particles to between about 0.01% and about 3.0% by weight or volume of the metal sulfide leach particles. According to some embodiments, the low-yield metathesis reactions may be controlled so as to limit the production of an iron-depleted metastable phase on metal sulfide leach particles to between about 0.01% and about 10% by weight or volume of the metal sulfide leach particles. According to some embodiments, the low-yield metathesis reactions may be controlled so as to limit the production of an iron-depleted metastable phase on metal sulfide leach particles to between about 0.01% and about 1.0% by weight or volume of the metal sulfide leach particles. According to some embodiments, the low-yield metathesis reactions may be controlled so as to limit the production of an iron-depleted metastable phase on metal sulfide leach particles to between about 0.01% and about 0.5% by weight or volume of the metal sulfide leach particles. According to some embodiments, the low-yield metathesis reactions may be controlled so as to limit the production of an iron-depleted metastable phase on metal sulfide leach particles to between about 0.01% and about 0.1% by weight or volume of the metal sulfide leach particles.

According to some embodiments, the reductive activation circuit 220 comprises at least one stirred-tank reactor 202. According to some embodiments, the reductive activation circuit 220 comprises at least one shear-tank reactor 212. According to some embodiments, the at least one stirred-tank reactor 202 and at least one shear-tank reactor are configured in series within the reductive activation circuit 220. According to some embodiments, the at least one stirred-tank reactor 202 and the at least one shear-tank reactor are configured in parallel within the reductive activation circuit 220. According to some embodiments, the at least one shear-tank reactor 212 is disposed within the at least one stirred-tank reactor within the reductive activation circuit 220.

According to some embodiments, the metal sulfide leach circuit 200 further comprises an oxidative leach circuit 240 for leaching the metal sulfide leach particles comprising the iron-depleted metastable phase. According to some embodiments, the oxidative leach circuit 240 comprises at least one stirred-tank reactor 202. According to some embodiments, the oxidative leach circuit 240 comprises at least one shear-tank reactor 212.

According to some embodiments, the at least one stirred-tank reactor 202 and at least one shear-tank reactor are configured in series within the oxidative leach circuit 240. According to some embodiments, at least one stirred-tank reactor 202 and at least one shear-tank reactor are configured in parallel within the oxidative leach circuit 240. According to some embodiments, at least one shear-tank reactor 212 is disposed within at least one stirred-tank reactor within the oxidative leach circuit 240.

According to some embodiments, oxidative dissolution within the oxidative leach circuit 240 is substantially independent of the degree of completion of the conversion of the metal sulfide particles to the iron-depleted metastable phase.

According to some embodiments, a filter is provided between the reductive activation circuit 220 and the oxidative leach circuit 240. According to some embodiments, the filter is configured to remove iron from the metal sulfide leach circuit 200.

According to some embodiments, a residence time of the metal sulfide leach particles in the reductive activation circuit 220 is less than 1 hour. According to some embodiments, a residence time of the metal sulfide leach particles in the reductive activation circuit 220 is less than 30 minutes. According to some embodiments, a residence time of the metal sulfide leach particles in the reductive activation circuit 220 is less than 15 minutes. According to some embodiments, a residence time of the metal sulfide leach particles in the reductive activation circuit 220 is less than 10 minutes. According to some embodiments, a residence time of the metal sulfide leach particles in the reductive activation circuit 220 is less than 5 minutes.

According to some embodiments, a portion of the metal sulfide leach circuit 200 is maintained at a temperature which is less than the melt temperature of elemental sulfur. According to some embodiments, a portion of the metal sulfide leach circuit 200 is maintained at a temperature which is less than about 100° C. According to some embodiments, a portion of the metal sulfide leach circuit 200 is maintained at a temperature which is less than about 90° C. According to some embodiments, a portion of the metal sulfide leach circuit 200 is maintained at a temperature which is less than about 80° C.

According to some embodiments, a portion of the reductive activation circuit 220 operates at solids concentrations exceeding 10% solids. According to some embodiments, a portion of the reductive activation circuit 220 operates at solids concentrations exceeding 15% solids. According to some embodiments, a portion of the reductive activation circuit 220 operates at solids concentrations exceeding 20% solids. According to some embodiments, a portion of the reductive activation circuit 220 operates at solids concentrations exceeding 25% solids. According to some embodiments, a portion of the reductive activation circuit 220 operates at solids concentrations exceeding 30% solids. According to some embodiments, a portion of the reductive activation circuit 220 operates at solids concentrations exceeding 35% solids. According to some embodiments, a portion of the reductive activation circuit 220 operates at solids concentrations exceeding 40% solids. According to some embodiments, a portion of the reductive activation circuit 220 operates at solids concentrations exceeding 50% solids. According to some embodiments, a portion of the reductive activation circuit 220 operates at solids concentrations exceeding 60% solids.

According to some embodiments, the reductive activation circuit 220 operates at pH values between about 1 and about 6. According to some embodiments, the reductive activation circuit 220 operates at pH values between about 2 and about 6. According to some embodiments, the metal sulfide leach circuit 200 is configured for achieving chalcopyrite dissolution levels in excess of 90% in 9 hours or less. According to some embodiments, the metal sulfide leach circuit 200 is configured for achieving chalcopyrite dissolution levels excess of 90% in 6 hours or less. According to some embodiments, the metal sulfide leach circuit 200 is configured for achieving chalcopyrite dissolution levels in excess of 95% in 9 hours or less. According to some embodiments, the metal sulfide leach circuit 200 is configured for achieving chalcopyrite dissolution levels in excess of 95% in 6 hours or less. According to some embodiments, chalcopyrite dissolution is performed at atmospheric or substantially atmospheric conditions. According to some embodiments, an activation process within the reductive activation circuit 220 is substantially free of parasitic side reactions which consume Cu++.

According to some embodiments, the at least one shear-tank reactor 212 operates at a mixing energy higher than a mixing energy of the stirred-tank reactor 202. According to some embodiments, the at least one stirred-tank reactor 202 operates at a mixing energy between approximately 0.1 and 0.5 kW/m3. According to some embodiments, the at least one shear-tank reactor 212 operates at a mixing energy between approximately 5 and 100 kW/m3. According to some embodiments, the volumetric ratio of the at least one shear-tank reactor 212 to the at least one stirred-tank reactor 202 is between approximately 1:2 and 1:200. According to some embodiments, the volumetric ratio of the at least one shear-tank reactor 212 to the at least one stirred-tank reactor 202 is between approximately 1:4 and 1:100. According to some embodiments, the at least one shear-tank reactor 212 comprises grinding media, one or more high-shear impellers, or one or more high-shear rotor-stator couplings.

BRIEF DESCRIPTION OF THE DRAWINGS

To complement the description which is being made, and for the purpose of aiding to better understand the features of the invention, a set of drawings illustrating preferred apparatus and methods of using the same is attached to the present specification as an integral part thereof, in which the following has been depicted with an illustrative and non-limiting character. It should be understood that like reference numbers used in the drawings (if any are used) may identify like components.

FIGS. 2-5 illustratively show results obtained via bench-scale testing using the circuit shown in FIG. 6, wherein feed concentrate was activated within a reductive activation circuit to produce particles comprising a transitory/transitionary metastable non-stoichiometric binary metal sulfide phase.

In the following, the invention will be described in more detail with reference to drawings in conjunction with exemplary embodiments.

DETAILED DESCRIPTION OF THE INVENTION

The following description of the non-limiting embodiments shown in the drawings is merely exemplary in nature and is in no way intended to limit the inventions disclosed herein, their applications, or uses.

Figure 1:
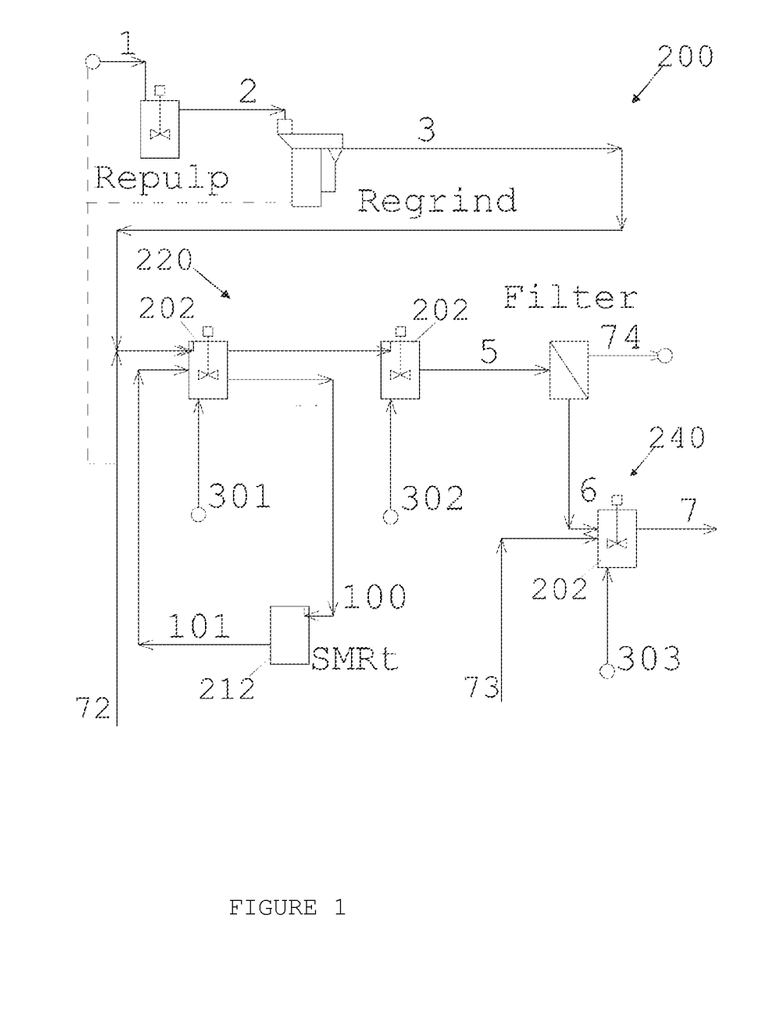
FIG. 1 is a schematic diagram illustrating a non limiting, exemplary metal recovery flowsheet which might employ certain aspects of the invention, wherein a reductive activation circuit 220 is employed, for example, upstream of oxidative leach circuit 240. Novel shear-tank reactors 212 may optionally be employed to the reductive activation circuit 202 as shown, without limitation. One or more stirred-tank reactors 202 may be employed in the reductive activation circuit 220 as shown.

FIG. 1 suggests a metal sulfide leach circuit 200 of a metal recovery flowsheet 110, wherein concentrate 1 (e.g., a flotation concentrate 116 from a sulfide concentrator 100) enters a re-pulp tank (labeled "Repulp"), wherein additional acid and/or oxygen (not shown) may be added to the re-pulp tank. Re-pulped concentrate 2 may enter a grinding operation. The grinding operation (labeled "Regrind") may optionally comprise one or more shear-tank reactors 212 arranged in series, or it may comprise a number of mills, such as fine grinding mills. Re-ground slurry 3 leaving the grinding operation enters a reductive activation circuit 220 within the metal sulfide leach circuit 200. The reductive activation circuit 220 may comprise one or more stirred-tank reactors 202, which may optionally have sparging means equipped to sparge a reactant gas, liquid, or gas/liquid combination 301, 302 therein. As shown, more than one stirred-tank reactor 202 may be employed within the reductive activation circuit 220, without limitation. As shown, stirred-tank reactors 202 may be arranged in series, without limitation.

hi some embodiments, one, some, or all portions of the activation circuit 220 may be fed with a copper source. For example, in some embodiments, one or more stilted-tank reactors 202 within the reductive activation circuit 220 may be operatively fed by a feed stream 72 comprising copper. In some embodiments, one or more shear-tank reactors 212 within the reductive activation circuit 220 may be operatively fed by a feed stream 72 comprising copper. In some embodiments, the re-pulp tank may be operatively fed by a feed stream 72 comprising copper. In some embodiments, the grinding operation may be operatively fed by a feed stream 72 comprising copper. The source of the copper in the feed stream 72 may comprise, without limitation, copper sulfate derived from off-spec copper cathode, raffinate comprising copper, electrolyte comprising copper, pregnant leach solution comprising copper (e.g., pregnant leach liquor from a copper heap leach operation), or the like, without limitation.

Optionally, one or more shear-tank reactors 212 (labeled "SMRt") may optionally be employed within the reductive activation circuit 220. While not shown, a shear-tank reactor 212 may be arranged in series between stirred-tank reactors 202, e.g., in an inter-stage configuration, without limitation. While not shown, a shear-tank reactor 212 may be arranged inside of a stirred-tank reactor 202, e.g., in an in-situ configuration, without limitation. In some embodiments, as shown, a shear-tank reactor 212 may be arranged in parallel with a stirred-tank reactor 202, in an intra-stage configuration, without limitation. In this regard, a shear-tank reactor 212 may process slurry 100 leaving, a stirred-tank reactor 202, and return shear-processed slurry 212 back to the same respective stirred-tank reactor 202. In some embodiments, a shear-tank reactor 212 may be arranged in series with another shear-tank reactor 212, without limitation.

Slurry 5 leaving the reductive activation circuit 220 may enter a filter (labeled "Filter"), where a liquid component 74 may be separated from a solid component 6. The liquid component 74 may comprise iron and processing solution used in the reductive activation circuit 220. The filter may, accordingly, be utilized to bleed iron from the metal sulfide leach circuit 200. Activated particles within the solid component 6 may then enter an oxidative leach circuit 240. As shown, the oxidative leach circuit 240 may comprise at least one stirred-tank reactor 202. The at least one stirred-tank reactor 202 may receive raffinate 73 (e.g., from a solvent/extraction process). The at least one stilled-tank reactor 202 may comprise sparging means equipped to sparge a reactant gas, liquid, or gas/liquid combination 303. Oxidatively-processed slurry 7 continues downstream. As suggested in FIG. 8, and taught in co-pending application PCT/US2015/061761, the oxidative leach circuit 240 may comprise one or more shear-tank reactors 212, without limitation.

Figure 7:
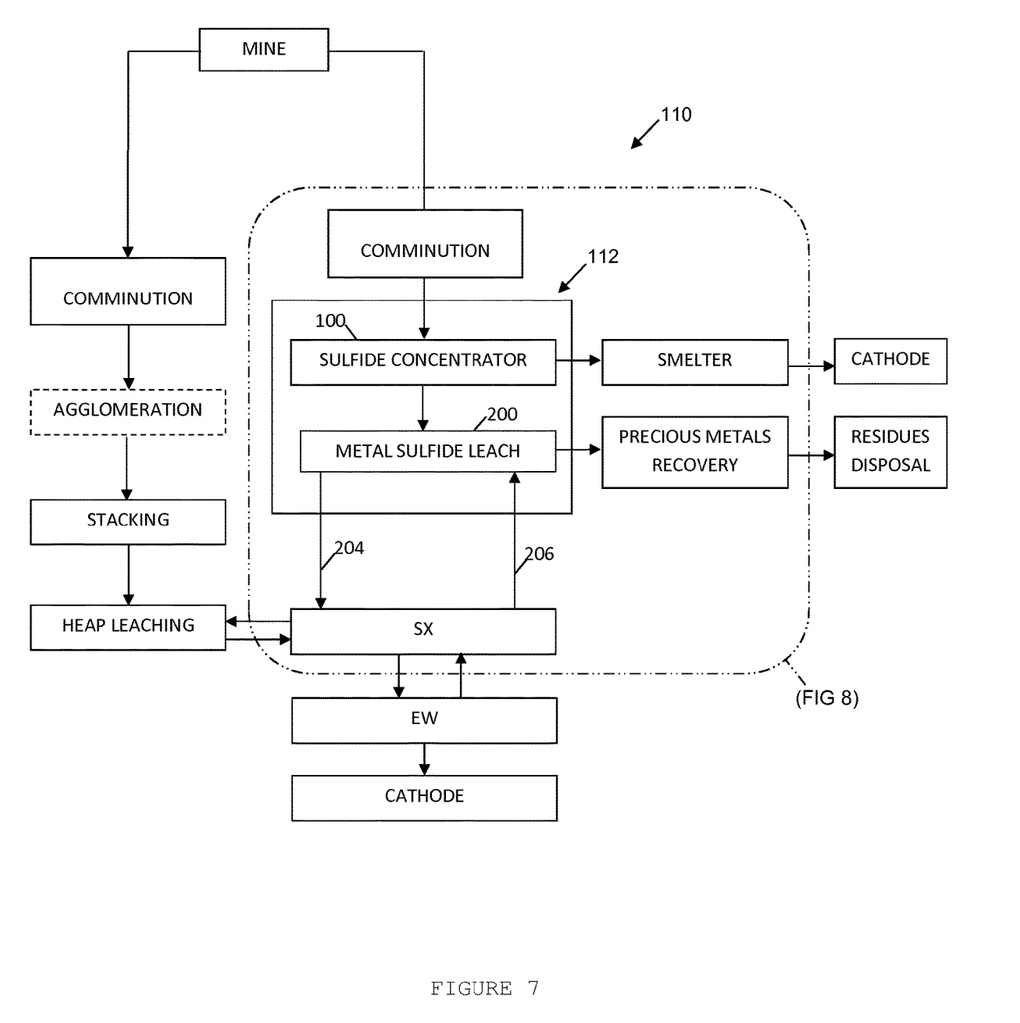
FIG. 7 is a schematic diagram illustrating a non-limiting, exemplary flowsheet which might employ certain embodiments of the invention.

Turning to FIG. 7, a metal recovery flowsheet 110 may comprise a unit operation 112 having therein, a sulfide concentrator 100 and a metal sulfide leach circuit 200. The metal sulfide leach circuit 200 may receive raffinate 206 from a solvent extraction operation, and may deliver pregnant leach solution 204 to a solvent extraction operation. Optionally, precious metals may be recovered from leach residue from the metal sulfide leach circuit 200.

Figure 8:
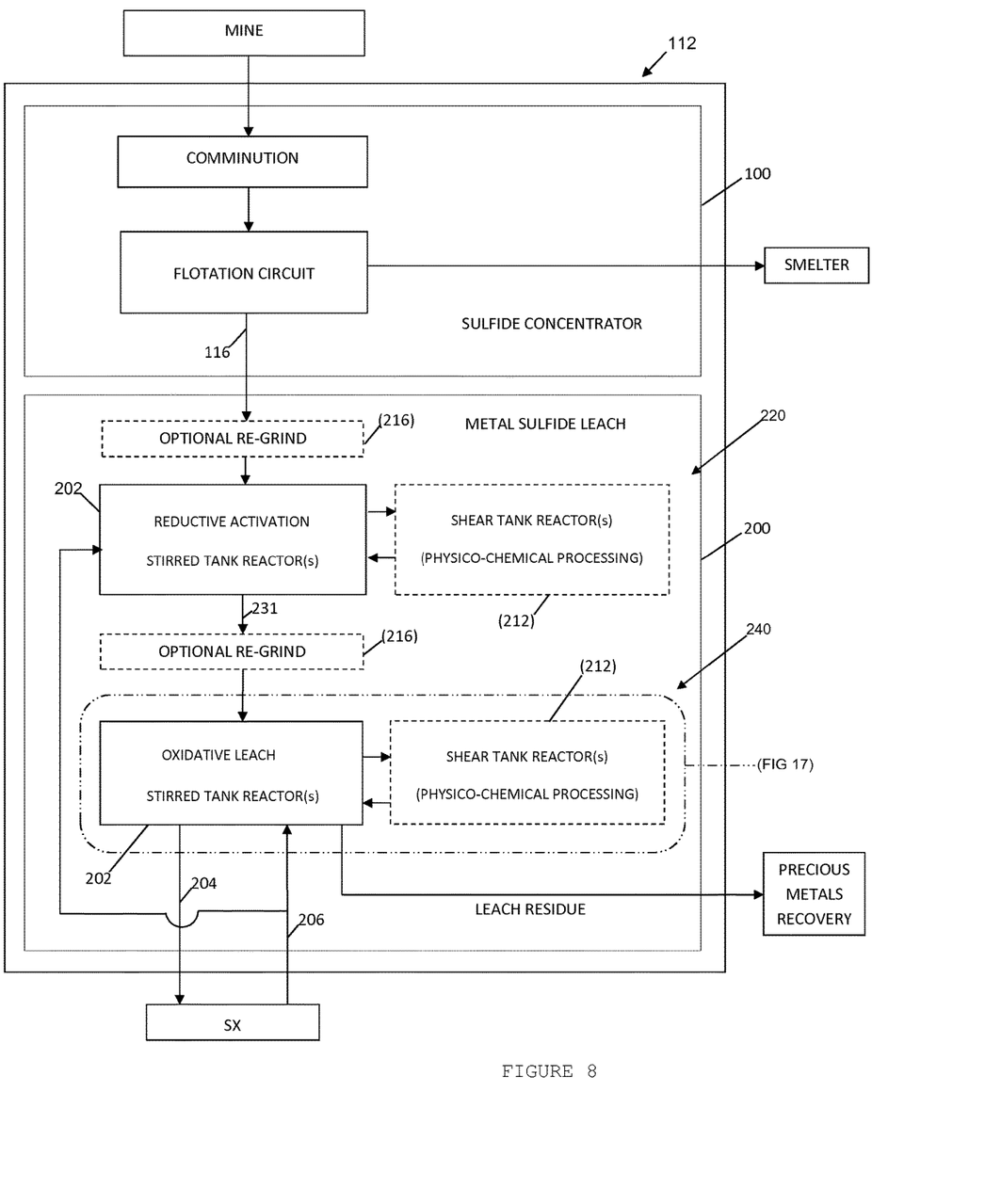
FIG. 8 is a schematic diagram illustrating, in more detail, a portion of the non-limiting, exemplary flowsheet shown in FIG. 7, wherein a reductive activation/pretreatment step may be performed prior to an oxidative atmospheric (or substantially atmospheric) metal sulfide leach process.
Figure 9:
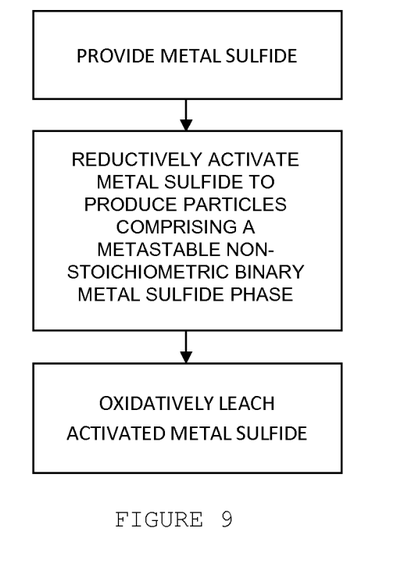
FIG. 9 is a schematic diagram illustrating a system and method of providing a reductive activation step prior to an oxidative atmospheric, substantially atmospheric, or above-atmospheric metal sulfide leach, according to some embodiments.

Turning now to FIG. 8, concentrate 116 leaving the sulfide concentrator 100 may enter an optional re-grind step 216 in a metal sulfide leach circuit 200. The concentrate 116 or re-ground concentrate leaving the optional re-grind step 216 is processed in a reductive activation circuit 220 within the metal sulfide leach circuit 200. The reductive activation circuit 220 may comprise a number of stirred-tank reactors 202 and/or a number of shear-tank reactors 212 as shown, without limitation. Slurry 231 leaving the reductive activation circuit 220 may enter an optional re-grind step 216. The slurry 231 or re-ground slurry leaving the optional re-grind step 216 may then be processed in an oxidative leach circuit 240 within the metal sulfide leach circuit 200. The oxidative leach circuit 220 may comprise a number of stirred-tank reactors 202 and/or a number of shear-tank reactors 212 as shown, without limitation. A portion of raffinate 206 may optionally be sent back to one or more portions of the reductive activation circuit 220 as a copper source.

In the following, the invention will be described in more detail with reference to drawings in conjunction with exemplary embodiments.

Example 1

In this Example we describe the use of a unique Physico-chemical activation process, involving the use of a shear-tank reactor 212, to enhance the oxidative leaching of chalcopyrite under atmospheric conditions to produce greater than 97% copper recoveries in under 4 hours.

Contrary to prior approaches which focused on high-yield metathesis reactions for complete conversions of chalcopyrite to other copper sulfides in order to facilitate secondary sulfide leaching, the inventors have unexpectedly discovered that low-yield metathesis reactions are much more effective and economical for leaching primary metal sulfides. These low-yield metatheses reactions may be advantageously utilized as a pre-activation process via a reductive activation circuit 220, prior to oxidative leaching in an oxidative leach circuit 240. Accordingly, it may be desirable to provide a reductive activation circuit 220 which is adequately configured to produce these low-yield metathesis products.

While not being held to any one particular theory, it is believed that the unexpectedly improved efficiency during oxidative leaching is achieved because embodiments of the inventive method have been shown to produce modified metal sulfide particles comprising a novel synthetic transitory/transitionary metastable non-stoichiometric binary metal sulfide phase which avoids parasitic side reactions found in prior art methods using high-yield metathesis reactions. Moreover, it is believed that the unexpectedly improved efficiency may be because with embodiments of the inventive method, leach kinetics and metal recovery during oxidative dissolution are, beyond a certain point, independent of the degree of solid state conversion of the modified metal sulfide particles. Preferred embodiments of the present inventive method, therefore, require only low-yield metathesis which can be conducted under atmospheric conditions, in short periods of time (e.g., from several hours to as little as only several minutes). This Example illustrates a two-stage process coupling Physico-Chemical activation with oxidative dissolution. In stage one, the primary sulfide (e.g., chalcopyrite) is treated reductively to only partially convert a small amount of chalcopyrite to an activated, non-stoichiometric product covellite, wherein iron is only partially exchanged by copper as illustrated by the equation:

$$Cu_xFe_yS_2 + ZCuSO_4 \rightarrow Cu_{x+z}Fe_{y-z}S_2 + ZFeSO_4$$

The fractional extent of conversion to the activated product is calculated as (Z/X).

In the present method, exposed surfaces of the chalcopyrite mineral phases are at least partially converted to a meta-stable, non-stoichiometric binary metal sulfide with the avoidance of parasitic side reactions that are characteristic of prior art methods. Without being held to any particular theory, we believe that partial conversion leads to the generation of point defects and to extensive crystal lattice strain, both of which in turn lead to enhanced oxidative leaching of chalcopyrite during stage two of the inventive method. Evidence for lattice strain was clearly visible as peak broadening in the x-ray diffraction pattern of the activated product.

Figure 6:
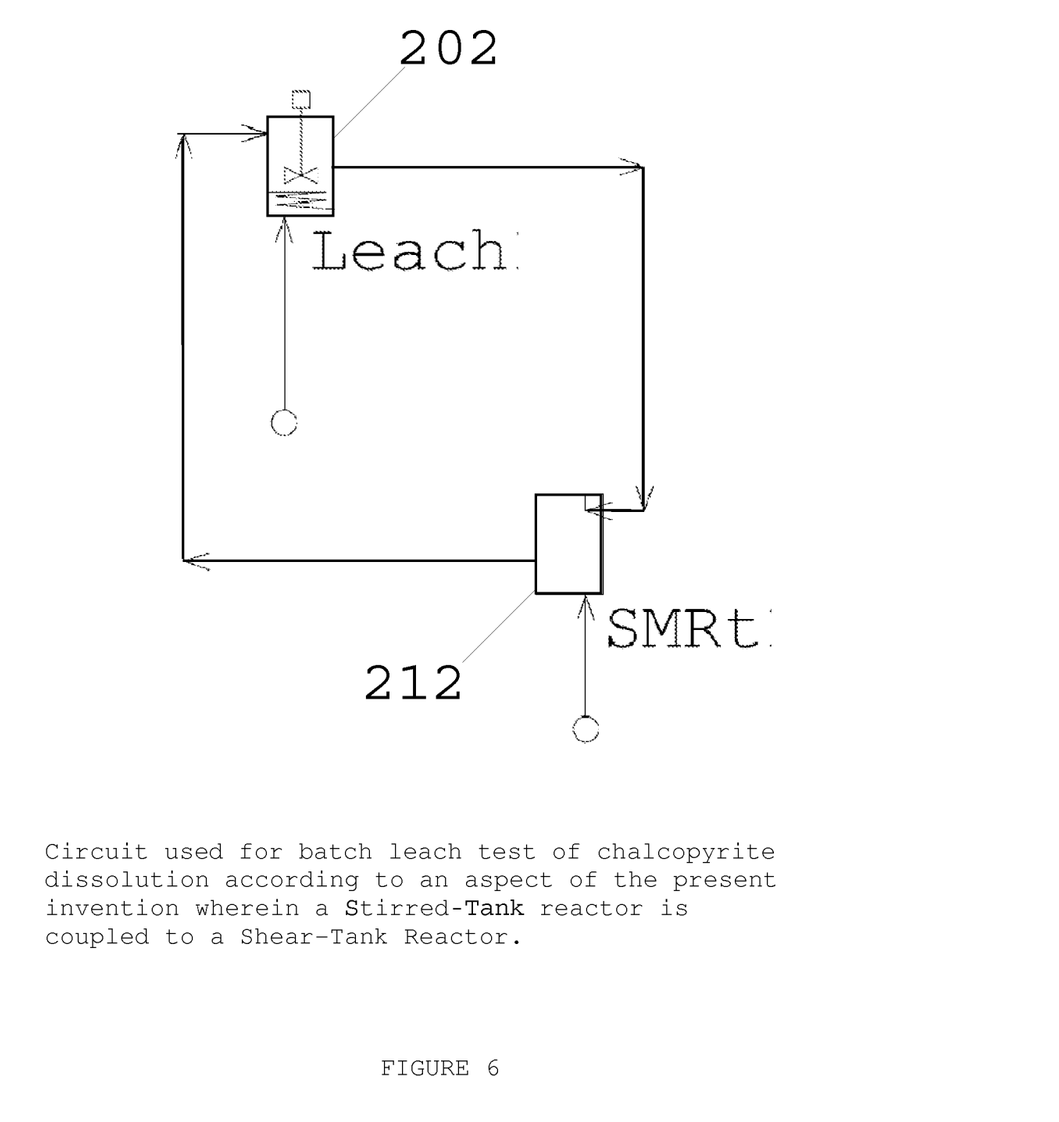
FIG. 6 is a schematic diagram illustrating a non-limiting, exemplary circuit which may be used to obtain batch leach test measurements.

In this example, a setup such as that shown in FIG. 6 was utilized, wherein a shear-tank reactor 212 was operatively coupled to a stirred-tank reactor 202. The shear-tank reactor 212 was configured as a stirred media reactor comprising grinding media. The only copper-bearing mineral in the copper concentrate feed was chalcopyrite. The P80 of the copper concentrate was 61 µm. The Physico-Chemical activation was conducted at 8% solids, pH≈1.8 and 80° C. The concentrate slurry contained an initial 2 g L$^{-1}$ total iron, 22.6 g L$^{-1}$ copper as copper sulfate. During the course of the Physico-Chemical activation process, iron within the chalcopyrite lattice was exchanged by copper in solution. During the activation step, the slurry redox potential dropped from about 565 mV to about 540 mV due to the release of Fe$^{2+}$. After 5.5 hours, the residual copper concentration in solution was about 16.8 g L$^{-1}$, giving an estimated conversion of chalcopyrite to covellite of approximately 29%. XRD analysis of the reaction product showed the absence of secondary, parasitic reaction products like Cu$_2$S which are present in prior art metathesis processes.

Although prior art methods have employed high-yield chemical metathesis reactions in which chalcopyrite is converted to copper sulfides, such as CuS, Cu$_2$S, etc., as a potential method for improving copper concentrate grades prior to treatment by pyrometallurgical processes (see for example R. D. Peterson and M. E. Wadsworth, "Solid, Solution Reactions in the Hydrothermal Enrichment of Chalcopyrite at Elevated Temperatures," EPD Congress 1994, The Minerals, Metals & Materials Society, pp. 275-291), embodiments of the present invention require only partial amounts of metastatic conversion, with the unexpected benefits of a metathesis reaction that avoids parasitic side reactions, and enhances oxidative dissolution of even un-converted, but surface-modified, chalcopyrite.

Example 2

In this Example we further describe the use of Physico-Chemical activation to enhance the oxidative leaching of chalcopyrite. In stage one, the chalcopyrite is treated reductively to partially convert chalcopyrite to a metastable, non-stoichiometric binary copper sulfide according to the following reaction stoichiometry:

$$Cu_xFe_yS_2 + ZCuSO_4 \rightarrow Cu_{x+z}Fe_{y-z}S_2 + ZFeSO_4$$

The reductive activation was conducted completely within a shear-tank reactor 212 at 80° C., a solids concentration of 15%, pH≈1.8, and enough copper sulfate to yield approximately 6.5% conversion of chalcopyrite. In this example, the shear-tank reactor was configured as a stirred media reactor comprising grinding media. The molar ratio of the initial solution copper to soluble iron which was contained within the concentrate feed was 0.066. The chalcopyrite concentrate, having a particle size distribution with a P80 of 17.5 µm, along with 2.5 g L$^{-1}$ copper sulfate and 2 g L$^{-1}$ ferrous sulfate were charged into the shear-tank reactor and the chalcopyrite was reductively activated with Cu$^{2+}$ for one hour.

The total mixing energy during the activation step was 72 kW·h/tonne. Concomitantly, the soluble-copper concentration dropped from about 2.5 g L$^{-1}$ to below detection as a result of the solid-state exchange reaction between cupric ion and ferrous ion located within the chalcopyrite crystal lattice.

The theoretical yield of the exchange reaction was 6.5%, relative to the initial amount of chalcopyrite present. While the exchange reaction in this test as allowed to continue for about an hour, the soluble copper was depleted within about 15-20 min. This indicates that Shorter reaction films (i.e., less than about 5 min.) might be equally effective and suggests that the mixing energy in this step could be reduced from 72 kW·h/tonne to under 25-100 kW·h/tonne.

At the completion of the Physico-Chemical activation, the slurry was transferred to the stirred-tank 202 reactor and the copper was leached oxidatively with O$_2$ sparging. The slurry Eh increased from less than 50 mV to approximately 650-655 mV during the course of the copper dissolution stage. The leach liquor was an acidic ferric sulfate lixiviant comprising 20 g L$^{-1}$ iron and an initial acid concentration of 44 g L$^{-1}$. The pH was allowed to rise during the course of the test. In this Example, the contents of the stirred-tank reactor 202 were recirculated through the shear-tank reactor 212 only during the oxidative leach stage.

Figure 2:
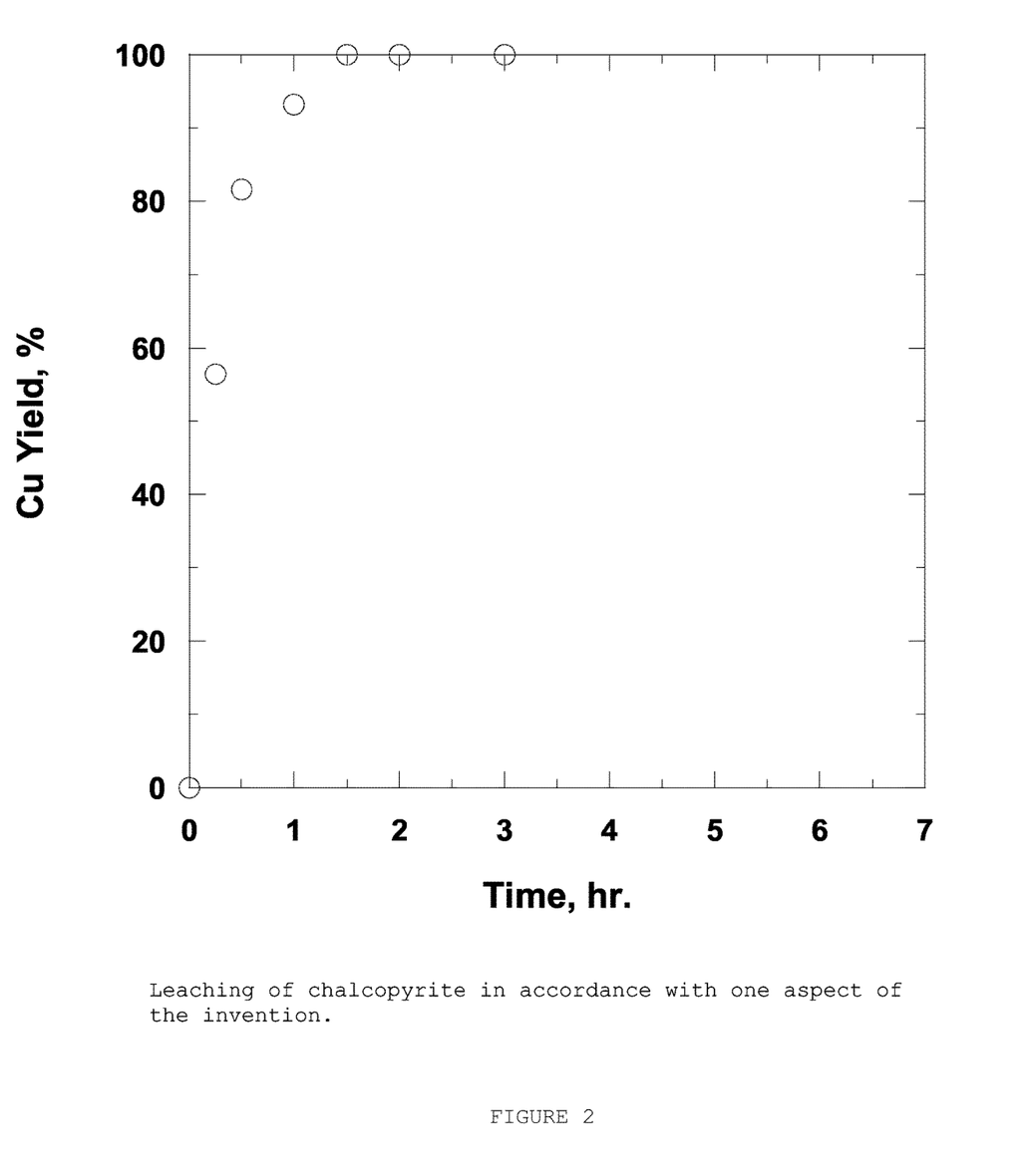
FIGS. 2 and 4 show results of oxidatively leaching activated concentrates, according to certain embodiments.

The resulting leach data are shown in FIG. 2. Greater than 98% copper recovery was achieved in about 1.5 hours after the start of the oxidative leach. This Example demonstrates that only partial surface conversion of chalcopyrite to a non-stoichiometric, metastable copper binary sulfide through the Physico-Chemical activation process is sufficient and optimal for achieving rapid copper dissolution from refractory minerals like chalcopyrite.

The present inventive method significantly departs from prior art (e.g., "The Sherritt-Cominco Copper Process—Part I: The Process," G. M. Swinkels and R. M. G. S. Berezowsky, CIM Bulletin, February, 1978, pp. 105-121 and U.S. Pat. No. 3,816,105) wherein the required high levels of iron removal (i.e., 50-70%) from chalcopyrite necessitates reaction temperatures in excess of 150° C. and activation reaction times in excess of an hour. At these prior art-required temperatures, the following reactions involving bornite and chalcopyrite occur:

$$Cu_5FeSO_4 + CuSO_4 \rightarrow 2Cu_2S + 2CuS + FeSO_4$$

$$CuFe_2 + CuSO_4 \rightarrow 2CuS + FeSO_4$$

Along with the undesirable side reaction:

$$5CuS + 3CuSO_4 + 4H_2O \rightarrow 4Cu_2S + 4H_2SO_4$$

In the Sherritt-Cominco Copper Process, an activated copper concentrate is subsequently pressure leached at temperatures above 100° C. A distinguishing drawback from such prior art methods, is the fact that unless the O$_2$ overpressure is significant, copper dissolution from chalcopyrite within the activated copper concentrate is limited to reactions involving only chalcocite (Cu$_2$S).

In the Sherritt-Cominco Copper Process, unreacted chalcopyrite from the activated copper concentrate is "not amenable to further treatment by either an activation leach or an oxidative leach" unless significant O$_2$ overpressures are used. This is contrary to the present invention, wherein atmospheric pressures and temperatures below about 100° C. are sufficient to achieve greater than 97% copper recovery within about 1-5 hours.

Unlike prior art methods, embodiments of the present inventive low-yield metathesis methods require only a few percent conversion of chalcopyrite to CuS by a Physico-Chemical activation process, wherein the conversion process may be prematurely stopped with little detriment during oxidative dissolution. Furthermore, the Physico-Chemical activation process does not produce undesirable, parasitic side reactions, such as the production of chalcocite, which serve only to consume copper sulfate.

Example 3

Figure 3:
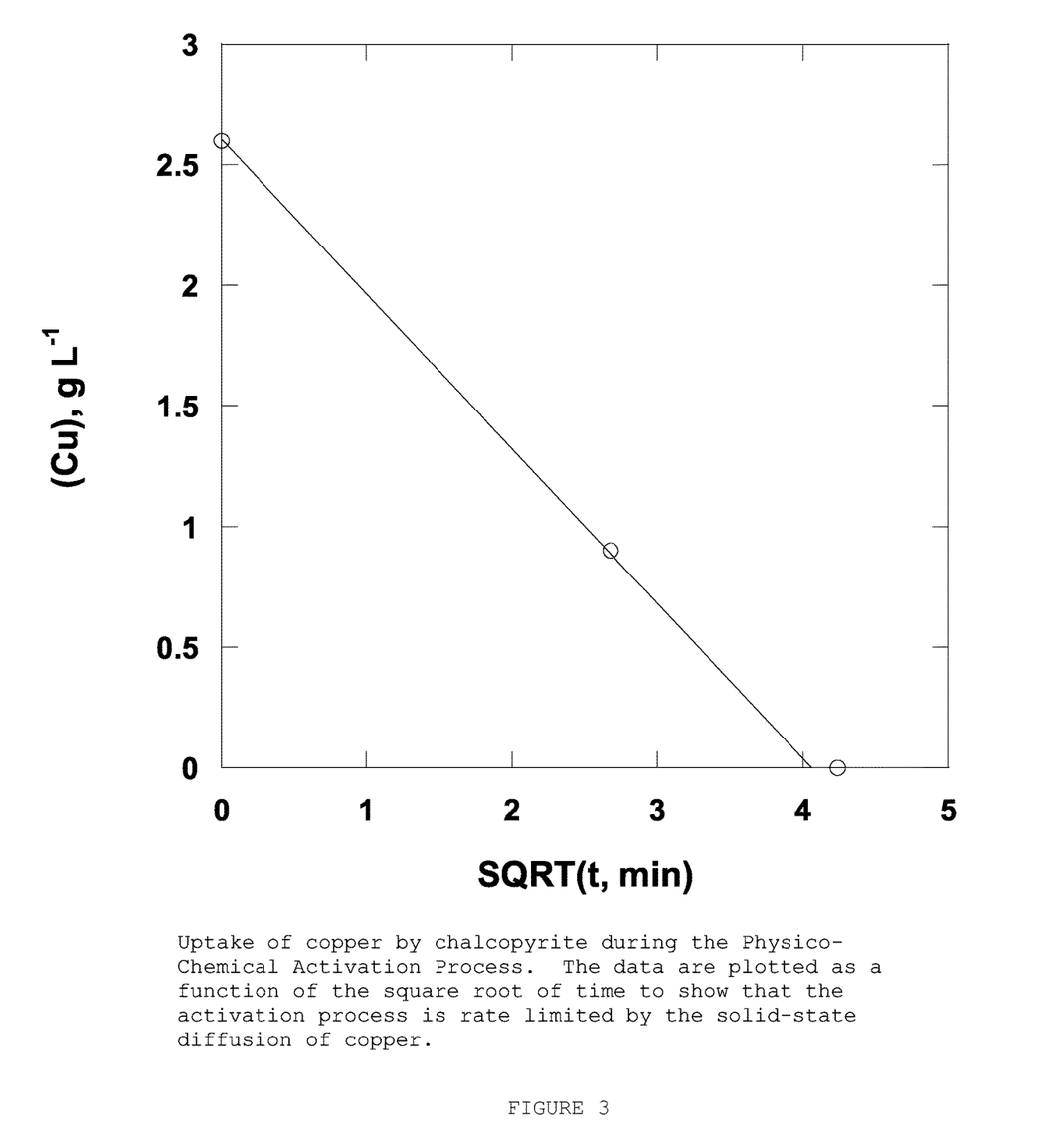
FIG. 3 shows copper uptake during activation within a reductive activation circuit, according to certain embodiments.
Figure 4:
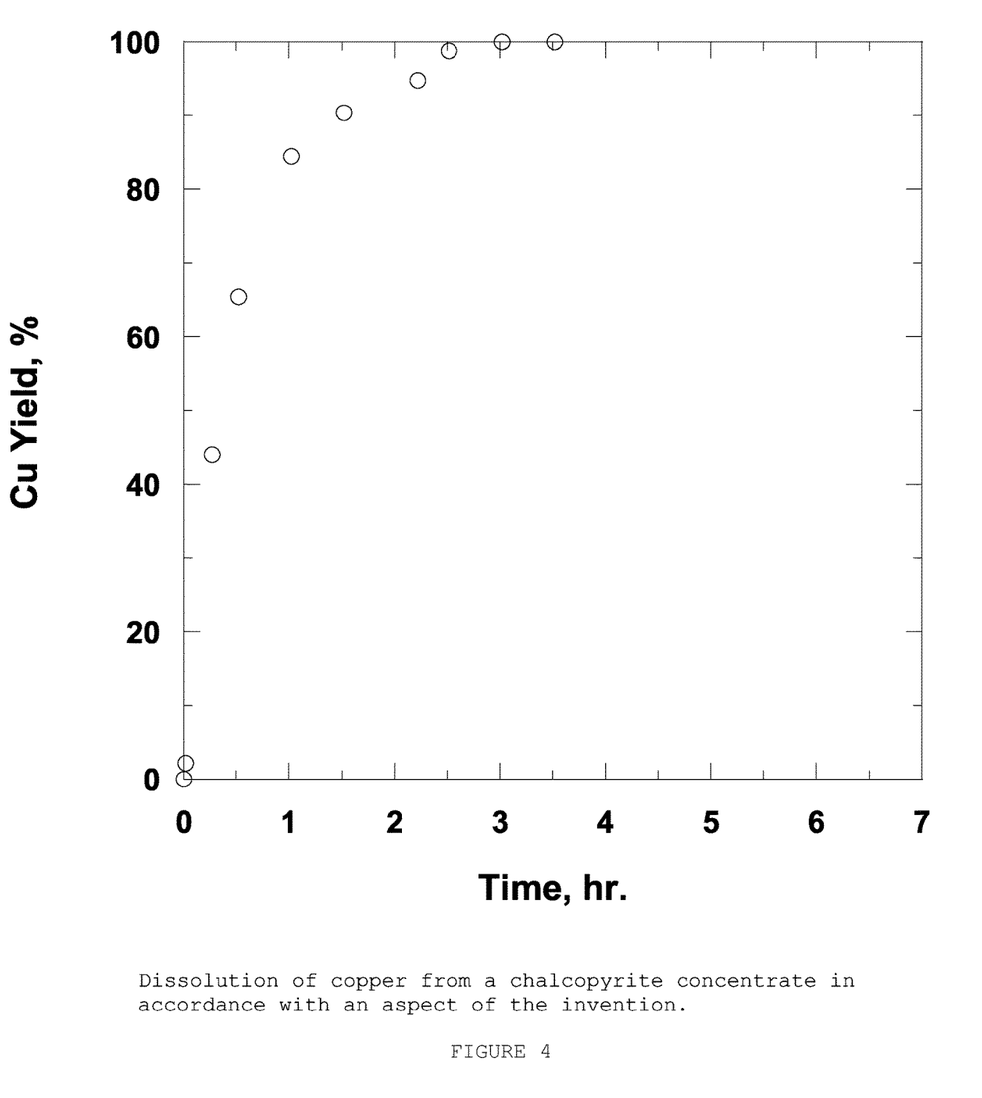
Figure 5:
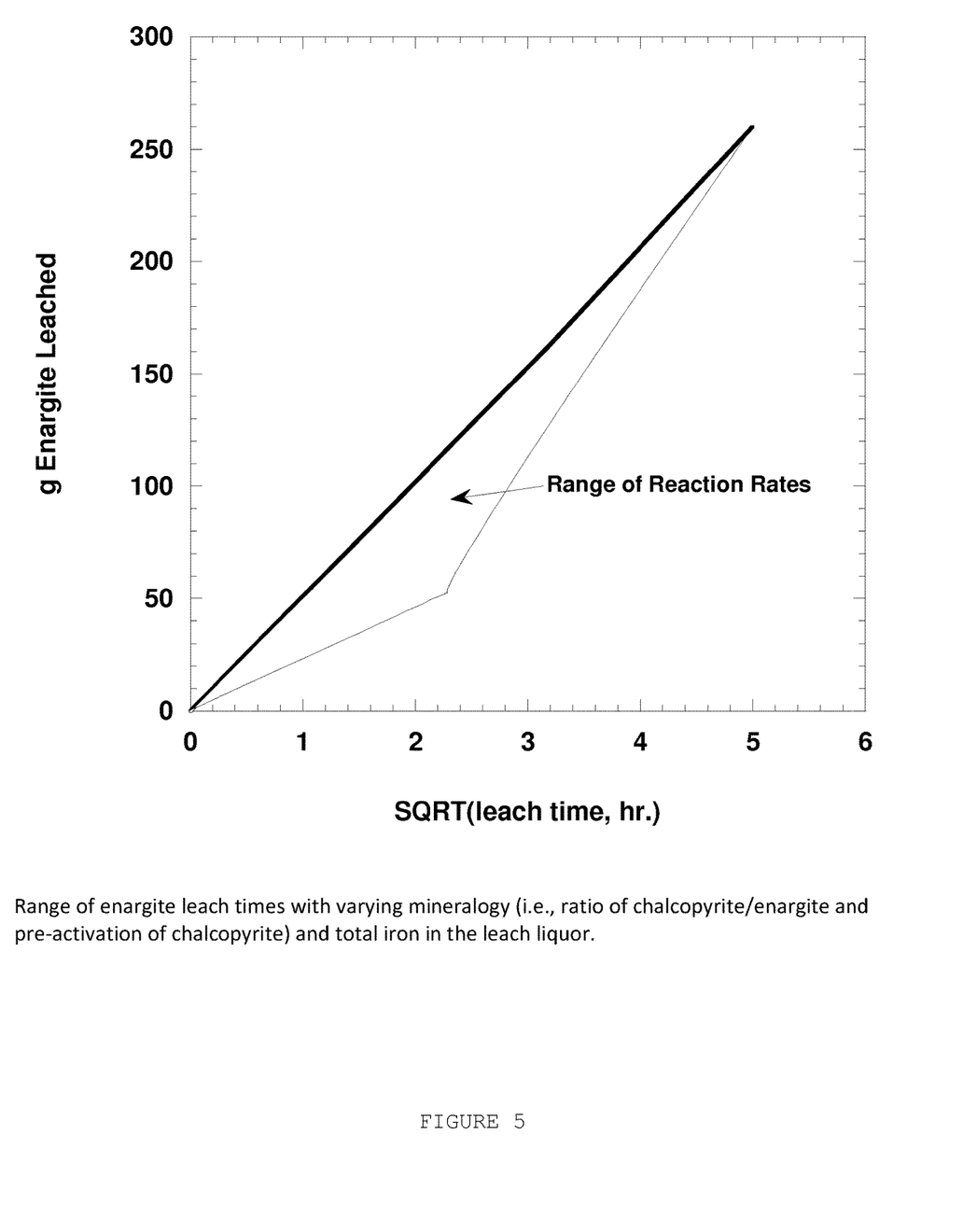
FIG. 5 suggests a range of reaction rates for leaching enargite according to certain embodiments.

This Example illustrates the use of a Physico-Chemical activation process to enhance chalcopyrite dissolution by atmospheric, acidic ferric sulfate leaching. Test conditions were identical to Example 2, except the residence time in the shear-tank reactor 212 during Physico-Chemical activation was limited to the time it took for complete copper uptake by the chalcopyrite concentrate. The rate of copper uptake by the concentrate is shown in FIG. 3. Reduction of the soluble copper concentration to below the detection limit was complete within about 15-17 minutes. A total mixing energy for the shear-tank reactor 212 of about 20 kW·h/tonne had been expended during the activation stage. After completing the Physico-Chemical activation, the slurry was transferred to a stirred-tank reactor 202 as shown in FIG. 6, with a lixiviant composition of 20 g $L^{-1}$ ferric, and 49 g $L^{-1}$ $H_2SO_4$ and the copper was leached oxidatively at 80° C. The activated slurry was recirculated between the stirred-tank reactor 202 and the shear-tank reactor 212 at the rate of 0.5 L $min^{-1}$. Greater than 97% copper dissolution was achieved in about 2.5 hours after the start of the oxidative leach process (see FIG. 4).

An additional, unexpected possible benefit of Physico-Chemical activation is the marked absence of frothing during the oxidative leaching of chalcopyrite. This is in contrast to prior art methods Which have been plagued by frothing, which makes it difficult to control oxygen delivery and particle residence times within the leach vessel(s) (see, for example, U.S. Pat. No. 5,993,635).

In some preferred embodiments, most or all of the reductive processing may occur at atmospheric pressure conditions e.g., chemical, processing occurring within one or more stirred-tank reactors 202). Dissolved copper may be provided to enable or facilitate the reductive activation process. The amount of dissolved copper provided should preferably be sufficient to complete the desired degree of conversion from the primary metal sulfide to the metastable, non-stoichiometric binary metal sulfide. The residence time required to complete the activation processing may typically be between approximately 5 and 60 minutes. For example, a residence time of approximately 10-45 minutes, or a residence time of approximately 15-30 minutes, such as 20 minutes, may be sufficient for a residence time of metal sulfide particles within a reductive activation circuit 220, prior to moving on to a downstream oxidative leach circuit 240. The activated metal sulfide concentrate may be optionally re-ground in step 216, or sent directly to an oxidative leach circuit 240.

Pregnant leach solution (PLS) created during the atmospheric or substantially atmospheric leaching of the metal sulfide concentrate may be sent from the oxidative leach circuit 240 to a downstream solvent extraction/electrowinning (SX/EW) circuit, direct electrowinning (D/EW) process, or continuous direct electrowinning (CD/EW) operation, without limitation.

Raffinate may be recycled from the respective solvent extraction/electrowinning (SX/EW) circuit, direct electrowinning (D/EW) process, or continuous direct electrowinning (CD/EW) operation, and sent back to the oxidative leach circuit 240. Leach residues formed within the atmospheric or substantially atmospheric metal sulfide leach circuit 200 may optionally be sent to a precious metals recovery circuit and/or ultimately to a leach residues disposal area. While not expressly shown, leach residue sulfur lay be internally or externally processed/recovered/removed, in order to create sulfuric acid for pH control or for re-supplying the leach processes within the metal recovery flowsheet 110, such as the reductive activation circuit 220 and/or the oxidative leach circuit 240. Manufactured sulfuric acid produced from the elemental sulfur may also be sent to another unit operation(s) or may be sold or distributed outside of the flowsheet, as a salable byproduct to help offset flowsheet operating costs.

In some embodiments, a bleed stream may be separated from the main flow of reductively-activated product. The bleed stream may enter a solid/liquid separation circuit which may comprise equipment such as a filter, thickener, centrifuge, cyclone, dewatering screen, or the like, without limitation. The solid fraction leaving the solid/liquid separation circuit may be recombined with the activated concentrate to be processed in the oxidative leach circuit 240. The liquid fraction leaving the solid/liquid separation circuit may optionally enter one or more downstream processes for recovering other metals or impurities removal, without limitation.

"Reductive activation", "reductive processing", or "reductive (pre)treatment" where described herein, may comprise any metathesis or pre-treatment step, process, system, or device which is capable of converting at least a portion of a leach particle from a first mineral phase to a second transitory/transitionary mineral phase. For example, a reductive pretreatment step may be configured to change or convert an outer surface of a leach particle from a primary metal sulfide (e.g., chalcopyrite) to a synthetic metastable non-stoichiometric binary metal sulfide phase which differs from chalcopyrite and covellite. In some embodiments, a reductive activation step may completely or partially modify, disturb, damage, or alter the crystal lattice of a leach particle sufficiently to enhance the oxidative dissolution process whereby the leach time to reach approximately 95% metal recovery from a metal sulfide concentrate can be achieved in about 6 hours or less.

In some instances, chalcopyrite leach particles may undergo a reductive activation/pre-treatment step in the one or more stirred tank reactors 202 within the reductive activation circuit 220, wherein at least a portion of the outer surface product layers of the chalcopyrite leach particles may be at least partially transformed to a transitory/transitionary mineral phase comprising a metastable non-stoichiometric binary metal sulfide phase, wherein the chalcopyrite leach particles are not fully converted to a secondary metal sulfide phase. For example, less than about half of each particle may be converted to said transformed transitory transitionary mineral phase, and more preferably, less than about 10% of each particle by weight, volume, or outer surface area may be converted to said transformed transitory/transitionary mineral phase, and therefore, residence time of the metal sulfide concentrate within the reductive activation circuit 270 may be kept to a minimum.

In some most preferred instances, the activation may require conversion of 0.01 to 5.0% of the primary sulfide; or alternatively may require conversion of 0.01 to 4.0% of the primary metal sulfide; or alternatively may require conversion of 0.01 to 3.0% of the primary sulfide; or alternatively may require conversion of 0.1 to 2.0% of the primary sulfide; or alternatively may require conversion of 0.1 to 1.0% of the primary sulfide; for example conversion of as little as 0.5 to 0.8% of the primary sulfide. The extent of conversion to the synthetic metastable non-stoichiometric binary metal sulfide phase is carried out so as to introduce a sufficient amount of point defects substantially throughout portions of an activated particle or substantially throughout the entirety of an activated particle, without incurring unnecessary operating expenditures (OPEX).

Redox potential may, in some instances, vary within the reductive activation process as a function of time or within various stirred-tank reactors 202. In some instances, reductive processing within portions of the reductive activation circuit 220 may comprise a different pH than a pH maintained during oxidative dissolution within portions of the subsequent oxidative leach circuit 240. Where redox potential within the reductive activation circuit 220 approaches an Eh regime of the oxidative leach circuit 240, then pH is a determining factor; wherein higher pH's (e.g., above a pKa of sulfate-bisulfate) will favor metathesis reactions activation processes, and lower pH's (e.g., below a pKa of sulfate-bisulfate) will favor oxidative dissolution reactions. However, in many cases, devices 202, 212 within the reductive activation circuit 220 will comprise a different redox potential than devices 202, 212 within the subsequent oxidative leach circuit 240. For example, the measured redox potential within devices 202, 212 of the reductive activation circuit 220 may fall within the range of approximately 200 mV (SHE) to about 650 mV (SHE), for example between about 200 mV and 450 mV (SHE), between about 400 mV and 650 mV (SHE) or between about 500 mV and 650 mV (SHE), without limitation; wherein portions of the metal sulfide particles (e.g., chalcopyrite leach particles) may be converted to a transitory/transitionary mineral phase comprising a metastable, nonstoichiometric binary metal sulfide phase. Measured redox potential within devices 202, 212 of the oxidative leach circuit 240, may fall within the range of approximately 600 mV (SHE) to about 800 mV (SHE), for example between about 650 mV and 750 mV (SHE) or between about 600 mV and 750 mV (SHE), without limitation. These redox potentials may change or fluctuate with time or depending on the composition of concentrate 1 and/or the metal value desired to be recovered from the concentrate 1. The reductive activation circuit 220 may maintain a reductive environment at a redox potential between 200 mV (SHE) and 650 mV (SHE) with simultaneous pH control, and the combination of pH and redox may be maintained in such a manner so as to produce a reductively-activated concentrate or metal sulfide product comprising a metastable non-stoichiometric binary metal sulfide phase.

In some embodiments, the metal sulfide concentrate (e.g., copper sulfide concentrate) may comprise residual flotation reagents. In some preferred embodiments, the metal sulfide comprises copper in the form of Chalcopyrite ($CuFeS_2$), and/or Covellite (CuS). However, it should be known that other metal-bearing minerals occurring in combination with metal sulfides (e.g., including Acanthite $Ag_2S$, Chalcocite $Cu_2S$, Bornite $Cu_5FeS_4$, Enargite $Cu_3AsS_4$, Tennamite $Cu_{12}As_4S_{13}$, Tetrahedrite $Cu_3SbS_3.x(Fe, Zn)_6Sb_2S_9$, Galena, PbS, Sphalerite ZnS, Chalcopyrite $CuFeS_2$, Pyrrhotite $Fe_{1-x}$, Millerite NiS, Pentiandite $(Fe,Ni)_9S_8$, Cinnabar HgS, Realgar AsS, Orpiment $As_2S_3$, Stibnite $Sb_2S_3$, Pyrite $FeS_2$, Marcasite $FeS_2$, Molybdenite $MoS_2$, Malachite $CuCO_3.Cu(OH)_2$, Azurite $2CuCO_3.Cu(OH)_2$, Cuprite $Cu_2O$, Chrysocolla $CuO.SiO_2.2H_2O$) may be used with the disclosed systems and methods.

In some embodiments, portions of the atmospheric or substantially atmospheric metal sulfide leach circuit 200, such as the plurality of stirred-tank reactors within the oxidative leach circuit 240, may be maintained below a pH of about 1.8 (e.g., between a pH of 0.5 and a pH of about 1.2).

In some preferred embodiments, the atmospheric or substantially atmospheric metal sulfide leach 200 may be maintained at a temperature which is below the melting point of elemental sulfur, so as to control passivation of the leaching particles (e.g., prevent smearing of sulfur onto leach particle surfaces).

It should be known that the particular features, processes, and benefits which are shown and described herein in detail are purely exemplary in nature and should not limit the scope of the invention. For example, where used herein, and in related co-pending applications referenced herein, the term "atmospheric leach" may comprise leaching under very small amounts of pressure which are close, but not exactly, ambient. In other words, while it is most preferred that "atmospheric" leaching is performed completely open to air, it is anticipated by the inventors that some best modes of leaching using the inventive concepts may incorporate the use of a plurality of stirred-tank reactors 202 which are open to air, and one or more smaller shear-tank reactors 212 which may be pressurizable (e.g., to 1-10 bar) to overcome oxygen transfer limitations. Accordingly, portions of the metal sulfide leach 200 (including portions of the reductive activation circuit 220) may be performed under slight pressure (e.g., in a covered or pressurizable vessel) or completely atmospherically (e.g., in a plurality of non-pressurized stirred-tank reactors).

It is further anticipated that in preferred embodiments, most (e.g., up to approximately 95%) of the cumulative oxidative leach time of a metal sulfide leach particle may occur at atmospheric conditions, while less than approximately 10% of the cumulative oxidative leach time may occur at or above atmospheric conditions, giving rise to the term "substantially atmospheric" used throughout this description.

Without departing from the intent of the invention, reductive and/or oxidative stirred-tank reactor head space may be atmospheric or alternatively pressurized to above ambient pressure to enhance mass transfer. The pressure may be controlled by temperature and/or by an applied gas pressure that is above ambient pressure. It is anticipated that above-atmospheric pressures, where/if used, may approach as much as 20 bar, but are preferably kept between about 1 bar and about 10 bar, for example, approximately 5 bar, without limitation.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A metal sulfide leach circuit 200 having therein, a reductive activation circuit 220 and an oxidative leach circuit 240; the reductive activation circuit 220 preceding the oxidative leach circuit 240 and being configured for performing metathesis reactions which are capable of producing an iron-depleted metastable phase on metal sulfide leach particles, wherein the reductive activation circuit 220 is configured such that the metathesis reactions produce the iron-depleted metastable phase at outer surface portions of the metal sulfide leach particles; the metal sulfide leach circuit 200 further being configured for controlling the metathesis reactions to limit the production of the iron-depleted metastable phase on the metal sulfide leach particles to between about 0.01% and about 10% by weight or volume of the metal sulfide leach particles; the reductive activation circuit 220 being maintained at a pH between 2 and 6, and the oxidative leach circuit 240 being maintained at a pH below 1.8 for leaching the metal sulfide leach particles comprising the iron-depleted metastable phase.

2. The metal sulfide leach circuit 200 according to claim 1, wherein the reductive activation circuit 220 is configured such that the metathesis reactions produce the iron-depleted metastable phase at inner portions of the metal sulfide leach particles which are below outer surface portions of the metal sulfide leach particles.

3. The metal sulfide leach circuit 200 according to claim 1, wherein the reductive activation circuit 220 is configured such that the metathesis reactions produce point defects within a portion of each of the metal sulfide leach particles.

4. The metal sulfide leach circuit 200 according to claim 1, wherein the reductive activation circuit 220 is configured such that the metathesis reactions produce point defects substantially entirely throughout the metal sulfide leach particles.

5. The metal sulfide leach circuit 200 according to claim 1, wherein a portion of the iron-depleted metastable phase comprises an intermediate phase between chalcopyrite and covellite.

6. The metal sulfide leach circuit 200 according to claim 1, wherein the reductive activation circuit 220 comprises at least one stirred-tank reactor 202.

7. The metal sulfide leach circuit 200 according to claim 1, wherein the reductive activation circuit 220 comprises at least one shear-tank reactor 212.

8. The metal sulfide leach circuit 200 according to claim 7, further comprising a stirred-tank reactor 202, wherein the at least one shear-tank reactor 212 operates at a mixing energy higher than the stirred-tank reactor 202.

9. The metal sulfide leach circuit 200 according to claim 8, wherein the at least one stirred-tank reactor 202 operates at a mixing energy between approximately 0.1 and 0.5 kW/m3.

10. The metal sulfide leach circuit 200 according to claim 7, wherein the at least one shear-tank reactor 212 operates at a mixing energy between approximately 5 and 100 kW/m3.

11. The metal sulfide leach circuit 200 according to claim 7, further comprising a stirred-tank reactor 202, wherein the volumetric ratio of the at least one shear-tank reactor 212 to at least one stirred-tank reactor 202 is between approximately 1:2 and 1:200.

12. The metal sulfide leach circuit 200 according to claim 1, wherein at least one stirred-tank reactor 202 and at least one shear-tank reactor are configured in series within the reductive activation circuit 220.

13. The metal sulfide leach circuit 200 according to claim 1, wherein at least one stirred-tank reactor 202 and at least one shear-tank reactor are configured in parallel within the reductive activation circuit 220.

14. The metal sulfide leach circuit 200 according to claim 1, wherein at least one shear-tank reactor 212 is disposed within at least one stirred-tank reactor within the reductive activation circuit 220.

15. The metal sulfide leach circuit 200 according to claim 1, wherein the oxidative leach circuit 240 comprises at least one stirred-tank reactor 202.

16. The metal sulfide leach circuit 200 according to claim 15, wherein the at least one stirred-tank reactor 202 and at least one shear-tank reactor 212 are configured in series within the oxidative leach circuit 240.

17. The metal sulfide leach circuit 200 according to claim 15, wherein the at least one stirred-tank reactor 202 and at least one shear-tank reactor 212 are configured in parallel within the oxidative leach circuit 240.

18. The metal sulfide leach circuit 200 according to claim 15, wherein at least one shear-tank reactor 212 is disposed within the at least one stirred-tank reactor 202 within the oxidative leach circuit 240.

19. The metal sulfide leach circuit 200 according to claim 1, wherein the oxidative leach circuit 240 comprises at least one shear-tank reactor 212.

20. The metal sulfide leach circuit 200 according to claim 1, wherein oxidative dissolution within the oxidative leach circuit 240 is substantially independent of the degree of completion of a conversion of the metal sulfide particles to the iron-depleted metastable phase.

21. The metal sulfide leach circuit 200 according to claim 1, wherein a residence time of the metal sulfide leach particles in the reductive activation circuit 220 is less than 1 hour.

22. The metal sulfide leach circuit 200 according to claim 1, wherein a portion of the metal sulfide leach circuit 200 is maintained at a temperature which is less than the melt temperature of elemental sulfur.

23. A metal sulfide leach circuit 200 having therein, a reductive activation circuit 220 configured for performing metathesis reactions which are capable of producing an iron-depleted metastable phase on metal sulfide leach particles, wherein the reductive activation circuit 220 is configured such that the metathesis reactions produce the iron-depleted metastable phase at outer surface portions of the metal sulfide leach particles; the metal sulfide leach circuit 200 further being configured for controlling the metathesis reactions to limit the production of the iron-depleted metastable phase on the metal sulfide leach particles to between about 0.01% and about 10% by weight or volume of the metal sulfide leach particles; wherein at least one shear-tank reactor 212 is disposed within at least one stirred-tank reactor within the reductive activation circuit 220.

24. A metal sulfide leach circuit 200 having therein, a reductive activation circuit 220 configured for performing metathesis reactions which are capable of producing an iron-depleted metastable phase on metal sulfide leach particles, wherein the reductive activation circuit 220 is configured such that the metathesis reactions produce the iron-depleted metastable phase at outer surface portions of the metal sulfide leach particles; the metal sulfide leach circuit 200 further being configured for controlling the metathesis reactions to limit the production of the iron-depleted metastable phase on the metal sulfide leach particles to between about 0.01% and about 10% by weight or volume of the metal sulfide leach particles; the metal sulfide leach circuit 200 further comprising an oxidative leach circuit 240 for leaching the metal sulfide leach particles comprising the iron-depleted metastable phase; wherein the oxidative leach circuit 240 comprises at least one stirred-tank reactor 202; and wherein at least one shear-tank reactor 212 is disposed within the at least one stirred-tank reactor 202 within the oxidative leach circuit 240.

* * * * *